Patented July 13, 1943

2,323,911

UNITED STATES PATENT OFFICE 2,323,911

PROCESS FOR THE MANUFACTURE OF $\Delta^{4,5}$-ANDROSTENOL - 17 - ONES-3 CONTAINING AN UNSATURATED SIDE-CHAIN IN 17-POSITION AND DERIVATIVES THEREOF

Hans Herloff Inhoffen, Berlin-Wilmersdorf, Walter Hohlweg, Hohen-Neuendorf, near Berlin, and Willy Logemann, Berlin-Charlottenburg, Germany, assignors to Schering Corporation, Bloomfield, N. J., a corporation of New Jersey No Drawing. Application November 19, 1938, Serial No. 241,466. In Germany November 27, 1937

11 Claims. (Cl. 260—397.4)

This invention relates to a process of producing $\Delta^{4,5}$-androstenol-17-ones-3 containing an unsaturated side-chain in 17-position and derivatives thereof.

In Serini, Köster, and Strassberger U. S. patent application Serial No. 145,824, filed June 1, 1937, a process is described of producing unsaturated ketones of the cyclopentanopolyhydrophenanthrene series from the corresponding secondary alcohols, consisting in treating such secondary alcohols in the form of aluminum- or magnesium-alcoholates or in the presence of other aluminum- or magnesium-alcoholates, with an excess of a ketone or aldehyde to effect an exchange of oxidation stages.

Now we have found that physiologically very valuable compounds containing in 17-position an unsaturated side-chain and, in particular, 17-ethenyl or 17-ethinyl-$\Delta^{4,5}$-androstenol-17-ones-3 can be obtained when 17 ethenyl or 17-ethinyl-$\Delta^{5,6}$-androstendiols-3,17 are used as starting material. One may start with derivatives of the named compounds in which the hydroxyl-group at the carbon atom 17 is substituted by a group adapted to be converted into the hydroxyl-group.

The ketones or aldehydes required for the process according to the invention are preferably used in excess, the oxidation being the smoother the larger is the excess of ketone or aldehyde; as ketones or aldehydes, we may name, for instance, cyclohexanone, acetone, acetophenone, benzaldehyde.

The keto-compound formed in accordance with the invention can be isolated in pure state from the mixture of reaction in the known manner by fractional crystallisation, distillation or sublimation, and also by means of ketone-reagents, such as semicarbazide and the like.

The following examples serve to illustrate the invention without, however, limiting the same to them.

Example 1

1.8 g. of ethenyl-androstendiol-3,17, prepared in accordance with the process of U. S. patent application Serial No. 111,363, filed by Josef Kathol November 18, 1936, are boiled with 2 g. of aluminum isopropylate and a mixture of 100 cc. of benzene and 50 cc. of dry acetone for 15 hours in a glycerine bath at 110° C. bath temperature. After cooling, the solution is diluted with ether, then thoroughly shaken with dilute sulfuric acid and washed with water. After evaporation of the solvent, the residue is recrystallized from methanol, yielding a first fraction having a melting point between 140 and 150° C., and a second more soluble fraction with a melting point of 130–140° C. The two combined fractions are treated with cold ether, undissolved constituents removed by filtration from the solution, and the clear solution concentrated after the addition of petrol ether until the ethenyl-androstenolone crystallizes out in needles. The separation of higher melting components difficultly soluble in ether and the crystallization of the soluble component, consisting of ethenyl-androstenolone, by means of petrol ether are repeated several times. The ethenyl-androstenolone is finally obtained in needles melting between 151 and 158° C; $(\alpha)_D = +67.6°$. The semicarbazone, prepared by boiling with alcoholic semicarbazide-acetate solution, precipitation with water and recrystallization from dilute acetone, melts at 220–221° C.

Example 2

A solution of 50 g. of 17-ethinyl-androstendiol-3,17 and 40 g. of aluminum isopropylate in a mixture of 2000 cc. of benzene and 1000 cc. of dry acetone is boiled under reflux for 15 hours at 110° C. bath temperature. Then the reaction mixture is poured into dilute sulfuric acid and, after addition of a large quantity of ether, thoroughly shaken whereby the very difficultly soluble oxidation product separates in a great measure at the separating layer. The ethereal solution is washed several times regardless of the material crystallising out whereupon the solution together with the crystals is evaporated to dryness, finally in a vacuum. After two times recrystallisation from chloroform-alcohol whereby the chloroform is evaporated to a large extent and after further filtering off by suction and washing with alcohol 31 g. of pure 17-ethinyl-$\Delta^{4,5}$-androstenon-3-ol-17 or $\Delta^{4,5}$-pregneninol-17-one-3, are obtained which melt at 264–266° C. and have a value of rotation of $(\alpha)_D = +21.5°$ (in dioxane).

Example 3

5 g. of 17-ethenyl-androstendiol-3,17 and 5.4 g. of aluminum isopropylate are heated together with a mixture of 250 ccs of toluene and 41 cc. of cyclo-hexanone for one hour to boiling. Thereupon the reaction solution is distilled with steam, the residue is extracted with ether and the ethereal solution successively washed with dilute sulfuric acid, soda solution and water. On evaporation of the ether the 17-ethenyl-androstenol-17-on-3 crystallised out. After recrystallisation from ether it shows a melting point of 142° C. and a value of rotation of $(\alpha)_D = +77.6°$ (in dioxane).

Of course, many changes and variations in the reaction conditions and the like may be made in accordance with the principles set forth herein and in the claims annexed hereto.

What we claim is:

1. Process of producing unsaturated ketones of the cyclopentano polyhydrophenanthrene series comprising subjecting a member of the group consisting of a $\Delta^{5,6}$ androstendiol-3,17 having an unsaturated side chain of two carbon atoms attached to the 17-carbon and a 17-derivative thereof in which the hydroxyl group is substituted by a group convertible with the aid of hydrolysis into the hydroxyl group, to the action of a carbonyl-containing compound of the class consisting of aldehydes and ketones in the presence of a member of the group consisting of aluminum secondary alcoholates and magnesium secondary alcoholates.

2. A process as set forth in claim 1, wherein the member of the class consisting of aldehydes and ketones is added in excess.

3. Process according to claim 1, wherein the metal secondary alcoholates is an aluminum compound of a saturated aliphatic monohydric alcohol.

4. Process according to claim 1, wherein the metal alcoholate is a magnesium alcoholate of the androstendiol starting compound.

5. Process according to claim 1, wherein the starting compound is a 17-ethenyl compound.

6. Process according to claim 1 wherein the starting compound is a 17-ethinyl compound.

7. A process as set forth in claim 9, wherein a member of the class consisting of lower aliphatic aldehyde and ketones is utilized.

8. Process of producing unsaturated ketones of the cyclopentano polyhydrophenanthrene series comprising subjecting a member of the group consisting of a $\Delta^{5,6}$-androstendiol-3,17 having an unsaturated side chain of two carbon atoms attached to the 17-carbon and a 17-derivative thereof in which the hydroxyl group is substituted by a group convertible with the aid of hydrolysis into the hydroxyl group, to the action of a carbonyl-containing compound of the class consisting of aldehydes and ketones in the presence of a metal alcoholate of the starting compound.

9. Process of producing unsaturated ketones of the cyclopentanopolyhydrophenanthrene series, comprising subjecting a member of the group consisting of $\Delta^{5,6}$-androstendiol-3,17 having an unsaturated side chain of two carbon atoms attached to the 17-carbon, and 17-derivatives thereof, in which the hydroxyl group is substituted by a group convertible with the aid of hydrolysis into the hydroxyl group, to the action of a member of the group consisting of aldehydes and ketones in the presence of aluminum isopropylate.

10. Process according to claim 1 wherein the starting compound is $\Delta^{5,6}$-17-ethinyl-androstendiol-3,17.

11. The semicarbazone of 17-ethinyl-$\Delta^{4,5}$-androstenol-17-one-3.

HANS HERLOFF INHOFFEN.
WALTER HOHLWEG.
WILLY LOGEMANN.

CERTIFICATE OF CORRECTION.

Patent No. 2,323,911.  July 13, 1943.

HANS HERLOFF INHOFFEN, ET AL.

It is hereby certified that error appears in the printed specification of the above numbered patent requiring correction as follows: Page 2, first column, line 36, for "claim 9" read --claim 1--; and second column, line 28, for "claim 1" read --claim 9--; and that the said Letters Patent should be read with this correction therein that the same may conform to the record of the case in the Patent Office.

Signed and sealed this 31st day of August, A. D. 1943.

(Seal)

Henry Van Arsdale,
Acting Commissioner of Patents.